W. K. Johnston,
Earth Auger.
№ 19,565. Patented Mar. 9, 1858.
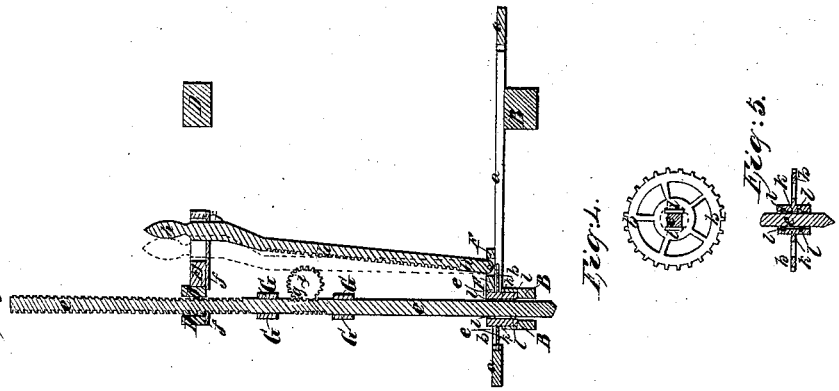
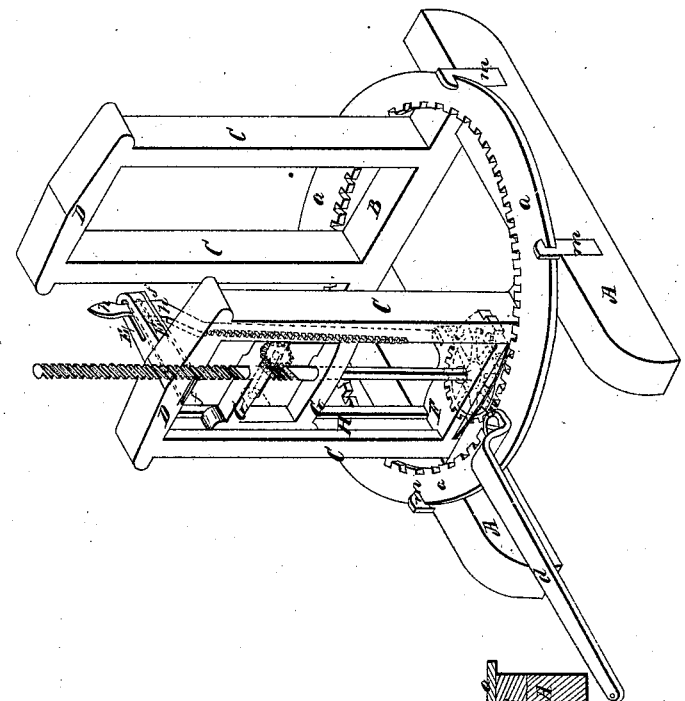
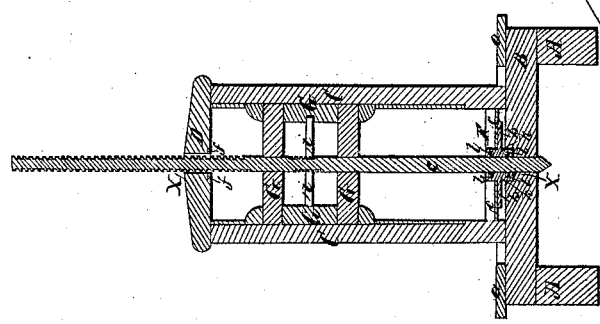

UNITED STATES PATENT OFFICE.

WM. K. JOHNSTON, OF ROCK ISLAND, ILLINOIS.

EXCAVATING POST-HOLES.

Specification of Letters Patent No. 19,565, dated March 9, 1858.

*To all whom it may concern:*

Be it known that I, WILLIAM K. JOHNSTON, of Rock Island, in the county of Rock Island and State of Illinois, have invented new and useful Improvements in Excavating Post-Holes, of which the following is a specification.

To fully explain the nature of my invention, and to enable others skilled in the construction of similar machinery to build and operate the same, I refer to the following specification—the accompanying schedule and drawings being a part thereof,—as a full description of my invention.

Figure 1 is an isometrical view of the machine; Fig. 2 is a transverse section through the center of borer. Fig. 3, a longitudinal section through the center of the borer. Fig. 4 is a plan of the pinion, showing the rollers. Fig. 5—section through the center of the pinion, showing the rollers.

To any of the post augers in common use (or to any suitable auger) I attach a shaft, which is square at its lower end, and has a screw cut upon its upper portion, and a screw also near its middle.—See at (*e*) Figs. 1, 2 and 3. A frame-work of wood (*c*, Figs. 1, 2) furnishes bearings for this auger shaft by holes through its top and bottom portions, as seen at (X Fig. 2). Near the lower portion of the shaft, where it passes through the portion of the frame (B) at (X) it also passes through a pinion wheel, shown in Fig. 3 being there surrounded by anti-friction rollers, and being in fact itself the axle of said pinion.

The upright frame-work (C C D) before alluded to, is attached at its lower end to a cross-timber (B, Fig. 2) which is itself framed into a sill, or runner, at each end: a similar frame-work is attached to the other end of the runners (A A)—the whole thus constituting a kind of sled, which may be easily drawn to the place where it is to be used.

Lying flat on the runners, and surrounding all of the upright frame-work is a wheel, consisting of a rim only, without shaft or arms; and having cogs on its inner side which work into the cogs on the pinion. This driving wheel is marked (*a a a*, Fig. 1). A draft lever (*d*) is attached to the driving wheel to which the horse may be attached for dragging the machine from place to place, or putting it in motion for boring post holes. The driving wheel (*a a a*) is kept in place during its revolution, by guides upon the runners (*m, m, m*, Fig. 1).

The upright frame-work (*c c* Fig. 1) has a grooved way on its inside (H, Fig. 1) in which plays a gate or small frame (G G G G), carrying a small cogged wheel upon one side—(*g*, Fig. 3). This frame or gate is connected to the auger-shaft (*e e*) by a pin working in a groove in said shaft. From a part of the frame-work (F, Fig. 3), and attached to the same by a pivot, rises, near the auger shaft and nearly parallel to the same, a cogged bar (*h h*, Fig. 3). The top of this cogged bar works in a slot, so that it may be moved backward and forward (seen at E E, Fig. 1). Attached to the top of the cogged bar, and playing in a groove in a part of the frame marked (D Fig. 3) is a portion of a nut, working into the screw on the auger shaft; and so arranged that when the cogged bar is made to approach the shaft by moving its top in the slot, the half-nut is thrown away from the said screw. When the bar is moved away from the shaft, it again brings the half-nut to bear on the screw. The small cogged wheel (*g*, Fig. 3) has its cogs working in the screw on the middle portion of the auger shaft; and when the cogged bar (*h h*) is made to approach the auger-shaft by moving in the slot at (E Fig. 3) the cogged wheel (*g*) then plays also in the cogs of this bar.

The operation of the machine is as follows: When the machine is in the proper place to bring the auger to the ground where you wish, the driving wheel (*a a a*) is turned, in a direction, "with the sun", the cogged bar (*h h*), is moved in its slot away from the auger-shaft, thereby connecting the portion of a screw-nut with the screw on the said shaft, and disconnecting said cogged bar from the wheel (*g*, Fig. 3). The cogs on the wheel (*a a a*) turn the wheel or pinion (*b b*, Fig. 4) and with it, as its shaft or axle, the shaft of the auger. The screw on the upper portion of said shaft, working in the half-nut, causes the shaft to descend, thus forcing the auger into the ground at the same time that it is turning around. As the auger-shaft descends, it carries down with it the gate (G G, Fig. 1) and its attached cog-wheel (*g* Fig. 3).

When it is desired to withdraw the auger, the top of the cogged bar is moved in its slot, toward the auger shaft, thus disconnecting the nut from the screw on the auger shaft, and connecting the cogged wheel (*g*) with said cogged bar. Still moving the driving wheel in the same direction as before, the auger is withdrawn by the action of the wheel (*g*) on the cogged bar. The machine is then dragged to the proper spot for the next post-hole, the cogged bar reversed, and the same course repeated as before.

Although I have thus fully described my invention, I do not confine myself to a driving wheel of the form described, but contemplate using a wheel for that purpose, having a central shaft, and cogs on its outside. I have also contemplated the using of two augers at once—one at each end of the general frame-work, and both moved by the same driving wheel.

Now, what I claim as my invention, and desire to secure by Letters Patent is—

The arrangement of the pinion (*b*) the shaft (*e*) the gate (G) the wheel (*g*) the cogged bar (*h*) carrying the half-nut (*f*), the whole arranged and operating as described for the purpose described.

WM. K. JOHNSTON.

Witnesses:
 GEO. E. HOLMES,
 EDWARD MURPHY.